United States Patent [19]

Simpson

[11] Patent Number: 4,933,894
[45] Date of Patent: Jun. 12, 1990

[54] CIRCUIT AND METHOD FOR ADDING BINARY NUMBERS WITH A DIFFERENCE OF ONE OR LESS

[75] Inventor: David L. Simpson, West Columbia, S.C.

[73] Assignee: NCR Corporation, Dayton, Ohio

[21] Appl. No.: 356,966

[22] Filed: May 24, 1989

[51] Int. Cl.$^5$ .............................................. G06F 7/50
[52] U.S. Cl. ................................................. 364/768
[58] Field of Search ............... 364/768, 784, 786, 787; 307/472

[56] References Cited

U.S. PATENT DOCUMENTS 4,052,604 10/1977 Maitland et al. ..................... 364/786
4,054,788 10/1977 Maitland et al. ..................... 364/786

Primary Examiner—Dale M. Shaw
Attorney, Agent, or Firm—Wilbert Hawk, Jr.; Stephen F. Jewett; Douglas S. Foote

[57] ABSTRACT

The subject invention is a circuit and method of providing the sum of first and second n bit binary numbers having a difference of one or less. The method comprises combining the least significant bits of the numbers in a first coincidence gate to provide the least significant bit of the sum, combining the nth and (n−1)st bits of the numbers in a first logic network to provide the most significant bit of the sum, and combining solely the ith and (i−1)st bits of the numbers in an ith logic network to provide the ith bit of the sum, for all values of i where $1 < i < n+1$.

23 Claims, 2 Drawing Sheets

CIRCUIT AND METHOD FOR ADDING BINARY NUMBERS WITH A DIFFERENCE OF ONE OR LESS

The present invention relates generally to electronic circuits, and more particularly to circuits for adding binary numbers.

BACKGROUND OF THE INVENTION

Since addition of binary numbers is common in a computer, it is desirable to perform this operation quickly. A typical adder is constructed from a plurality of logic gates with each gate introducing a delay to the operation. Because of the requirement to generate a carry bit when adding two numbers, the ripple or propagation delay increases with the number of bits in the numbers. For example, adding two digits and a carry bit requires a minimum delay path of two gates in order to generate both the digit and the next carry bit. If two n-bit numbers are added in this manner, a delay path of $2^n$ gates would be anticipated. Such delays are obviously undesirable, particularly for large values of n.

It is possible to reduce the propagation delay. For example, logic arrays consisting of many logic gates can be designed to handle more than a single pair of digits simultaneously. A typical logic array, such as a 745283 chip with four full adders, adds two four bit binary numbers with a maximum delay path of three gates from the input of any gate to the carry bit. When such adders are cascaded to add larger numbers, the delay will increase. The delay path for two n-bit numbers is generally about 3n/4 gates. In general, the delay in adders is a function of the complexity and cost of the gating network used.

One application for adders in a computer is associated with first-in, first-out (FIFO) memory buffer designs. For example, one FIFO memory design employs four eight bit FIFO buffers which serve as a buffer between an eight bit and 32 bit data bus. Data that is received on the eight bit data bus is sequentially distributed to respective ones of the FIFO buffers. Data is read out of the FIFO buffers in parallel onto the 32 bit data bus. Conversely, data that is received on the 32 bit data bus is stored across all four FIFO buffers, and is read out sequentially from the buffers onto the eight bit data bus. Each FIFO buffer has a write and read pointer associated therewith to track the next location in the buffer where data is to be written to and read from, respectively. The difference between the write and read pointers is referred to as the count and represents the amount of memory space occupied within a FIFO buffer. The buffer counts have a particular relationship in that the greatest difference between the largest and smallest count will always be one or less. In order to know the total amount of data in all four buffers, the counts for each buffer must be added. The use of conventional adders for this operation would create the normal delays as discussed above.

OBJECTS OF THE INVENTION

It is therefore an object of the present invention to provide a new and improved circuit for adding binary numbers with a difference of one or less.

It is another object of the present invention to provide a new and improved method for adding binary numbers with a difference of one or less.

It is a further object of the present invention to provide an adder for binary numbers with a difference of one or less which has a reduced number of gate delays.

It is yet another object of the present invention to provide an adder for binary numbers with a difference of one or less which has the same number of gate delays irrespective of the number of bits in the binary numbers.

It is yet a further object of the present invention to provide an adder for binary numbers with a difference of one or less which has a maximum of two gate delays irrespective of the number of bits in the binary numbers.

SUMMARY OF THE INVENTION

One form of the present invention is a circuit for providing the sum of first and second n bit binary numbers having a difference of one or less. The circuit comprises a plurality of coincidence gates. A first coincidence gate receives the least significant bit of each of the numbers and provides the least significant bit of the sum. Each of $n-1$ second coincidence gates receives the $(i-1)$st bit of each of the numbers ($1<i<n+1$), each of $n-1$ third coincidence gates receives the ith bit of each of the numbers, and each of $n-1$ fourth coincidence gates receives the output of respective ones of the second and third gates and provides the ith significant bit of the sum. A fifth coincidence gate receives the nth bit of each of the numbers, a sixth coincidence gate receives the nth and $(n-1)$st bits of the first number, a seventh coincidence gate receives the nth and $(n-1)$st bits of the second number, and an eighth coincidence gate receives the output of the fifth, sixth and seventh gates and provides the $(n+1)$st significant bit of the sum.

Another form of the present invention is a method of providing the sum of first and second n bit binary numbers having a difference of one or less. The method comprises combining the least significant bits of the numbers in a first coincidence gate to provide the least significant bit of the sum, combining the nth and $(n-1)$st bits of the numbers in a first logic network to provide the most significant bit of the sum, and combining solely the ith and $(i-1)$st bits of the numbers in an ith logic network to provide the ith bit of the sum, for all values of i where $1<i<n+1$.

DESCRIPTION OF A PREFERRED EMBODIMENT

Figure 1:
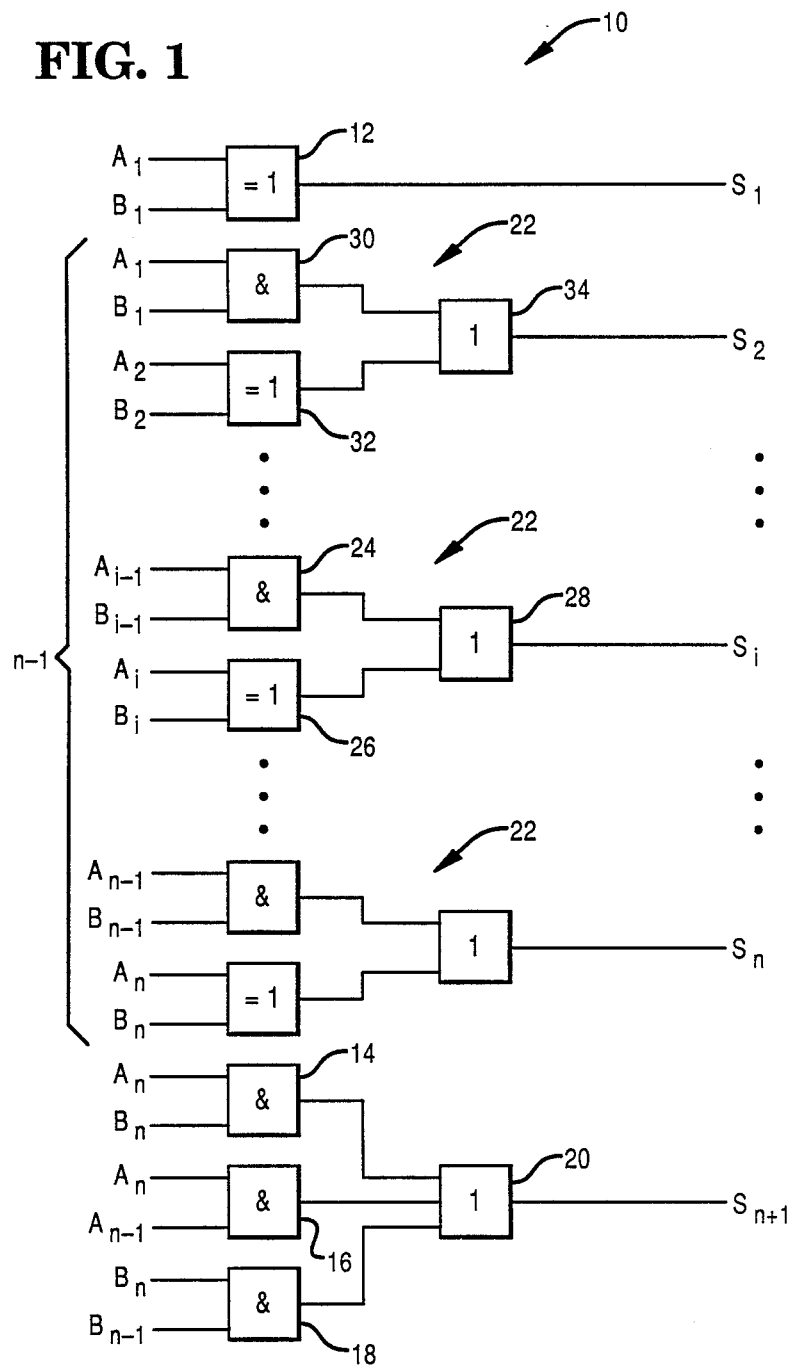
FIG. 1 is circuit diagram of a binary adder according to one form of the present invention.

FIG. 1 shows an adder circuit 10 for adding two n bit binary numbers A and B, where A and B have a difference of one or less. A is represented by binary digits $A_n$, $A_{n-1}, \ldots, A_i, \ldots, A_2, A_1$, with $A_n$ being the most significant digit and $A_1$ being the least significant digit. Similarly B is represented by binary digits $B_n$, $B_{n-1}, \ldots, B_i, \ldots, B_2, B_1$, with $B_n$ being the most significant digit of B and $B_1$ being the least significant digit. The sum of the two numbers A and B is designated as S and is represented by binary digits $S_{n+1}, S_n, \ldots, S_i, \ldots, S_2, S_1$, with $S_{n+1}$ being the most significant digit and $S_1$ being the least significant digit. The value of i in the sum S is such that $1<i<n+1$.

Circuit 10 comprises a plurality of coincidence gates which receive the various binary digits of the numbers A and B and provide an output of the binary digits of the sum S. The circuit includes an Exclusive OR gate 12 for receiving the least significant bits $A_1$ and $B_1$ of each of the numbers A and B, respectively. Gate 12 provides the least significant bit $S_1$ of the sum S at its output.

Circuit 10 further includes AND gates 14, 16 and 18, and OR gate 20. AND gate 14 receives the most significant bits $A_n$ and $B_n$ of the numbers A and B, respectively. AND gate 16 receives the most significant bit $A_n$ and second most significant bit $A_{n-1}$ of the number A. AND gate 18 receives the most significant bit $B_n$ and second most significant bit $B_{n-1}$ of the number B. OR gate 20 receives as inputs the outputs of AND gates 14, 16 and 18 and provides the most significant bit $S_{n+1}$ of the sum S at its output.

Circuit 10 also includes $n-1$ sets 22 of coincidence gates, each set 22 comprising three coincidence gates. Each set 22 includes an AND gate, Exclusive OR gate and OR gate. For example, the set which generates the ith bit $S_i$ includes AND gate 24, Exclusive OR gate 26 and OR gate 28. And gate 24 receives as inputs the $(i-1)$st bits $A_{i-1}$ and $B_{i-1}$ of the numbers A and B, respectively. Exclusive OR gate 26 receives as inputs the ith bits $A_i$ and $B_i$ of the numbers A and B, respectively. OR gate 28 receives as inputs the output of AND gate 24 and Exclusive OR gate 26 and provides the ith significant bit $S_i$ of the sum S at its output. As a further example, the set 22 which generates the second least significant bit $S_2$ of the sum S, includes AND gate 30, Exclusive OR gate 32 and OR gate 34. And gate 30 receives as inputs the least significant bits $A_1$ and $B_1$ of the numbers A and B, respectively. Exclusive OR gate 32 receives as inputs the second least significant bits $A_2$ and $B_2$ of the numbers A and B, respectively. OR gate 34 receives as inputs the output of AND gate 30 and Exclusive OR gate 32 and provides the second least significant bit $S_2$ of the sum S at its output.

A feature of the subject invention is that there are no carry bits generated during the addition of the numbers A and B. The least significant bits $A_1$ and $B_1$ are combined in Exclusive OR gate 12 and the least significant bit $S_1$ is provided. The nth bits $A_n$ and $B_n$ and $(n-1)$st bits $A_{n-1}$ and $B_{n-1}$ are combined in AND gates 14, 16 and 18 and OR gate 20 and the most significant bit $S_{n+1}$ is provided. For all of the other bits of the sum S, solely the ith and $(i-1)$st bits are combined and there is no carry bit required. Since there is no carry bit to include in any of the partial sums, all of the bits of the sum S are generated substantially simultaneously. Thus, the maximum delay associated with the addition of A and B will be two gates. Moreover, this delay will not increase irrespective of the value of n, i.e., the number of digits in the numbers A and B.

Figure 2:
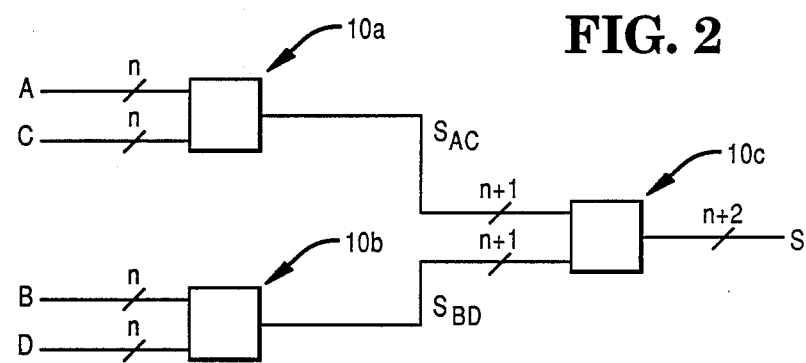
FIG. 2 is a block diagram illustrating an application of the binary adder shown in FIG. 1

A further application of the subject invention is illustrated in FIG. 2. Rather than adding just two numbers A and B, the FIG. 2 embodiment illustrates the addition of four numbers A, B, C and D, all having a difference of one or less. Furthermore, the sum of A and C and the sum of B and D will have a difference of one or less. An example of four numbers having this relationship is found in FIFO memory devices such as described above in the Background of the Invention. As long as four FIFO buffers are filled sequentially and emptied in parallel, the data count of the buffers will exhibit the relationship described above. FIG. 2 shows three adder circuits 10a, 10b and 10c, each similar to the adder circuit 10 illustrated in FIG. 1. Circuit 10a will combine n bit numbers A and C which have a difference of one or less and provide an $n+1$ bit sum $S_{AC}$ on its output. Circuit 10b will combine n bit numbers B and D which have a difference of one or less and provide an $n+1$ bit sum $S_{BD}$ on its output. Circuit 10c will combine $n+1$ bit numbers $S_{AC}$ and $S_{BD}$ which have a difference of one or less and provide an $n+2$ bit sum S on its output. S is the sum of the four numbers A, B, C and D.

It will be clear to those skilled in the art that the present invention is not limited to the specific embodiment disclosed and illustrated herein. Nor is the invention limited to an application for adding FIFO buffer counts. Rather, the invention may be applied equally to any application where two or more binary numbers having a difference of one or less are to be added.

Numerous modifications, variations, and full and partial equivalents can be undertaken without departing from the invention as limited only by the spirit and scope of the appended claims.

What is desired to be secured by Letters Patent of the United States is as follows:

1. A circuit for providing the sum of first and second n bit binary numbers having a difference of one or less, said circuit comprising:

a first coincidence gate for receiving the least significant bit of each of said numbers and providing the least significant bit of said sum;

$n-1$ second coincidence gates, each receiving the $(i-1)$st bit of each of said numbers $(1<i<n+1)$, $n-1$ third coincidence gates, each receiving the ith bit of each of said numbers, and $n-1$ fourth coincidence gates, each receiving the output of respective ones of said second and third gates and providing the ith significant bit of said sum; and a fifth coincidence gate for receiving the nth bit of each of said numbers, a sixth coincidence gate for receiving the nth and $(n-1)$st bits of said first number, a seventh coincidence gate for receiving the nth and $(n-1)$st bits of said second number, and an eighth coincidence gate for receiving the output of said fifth, sixth and seventh gates and providing the $(n+1)$st significant bit of said sum.

2. The circuit of claim 1 wherein said $n-1$ second, third and fourth gates form $n-1$ sets of gates, wherein said first set receives said least and second least significant bits of said numbers and provides the second least significant bit of said sum, said second set receives said second and third least significant bits of said numbers and provides the third least significant bit of said sum, and so forth.

3. The circuit of claim 1 wherein said first coincidence gate is an Exclusive OR gate.

4. The circuit of claim 1 wherein said second coincidence gate is an AND gate, said third coincidence gate is an Exclusive OR gate, and said fourth coincidence gate is an OR gate.

5. The circuit of claim 1 wherein said fifth, sixth and seventh gates are AND gates and said eighth gate is an OR gate.

6. A circuit for providing the sum of first and second n bit binary numbers having a difference of one or less, said circuit comprising:

a first Exclusive OR gate for receiving the least significant bit of each of said numbers and providing the least significant bit of said sum;

$n-1$ first AND gates, each receiving the $(i-1)$st bit of each of said numbers $(1<i<n+1)$, $n-1$ second Exclusive OR gates, each receiving the ith bit of each of said numbers, and $n-1$ first OR gates, each receiving the output of respective ones of said first AND gate and second Exclusive OR gate and providing the ith significant bit of said sum; and a second AND gate for receiving the nth bit of each of said numbers, a third AND gate for receiving the nth and (n−1)st bits of said first number, a fourth AND gate for receiving the nth and (n−1)st bits of said second number, and an second OR gate for receiving the output of said second, third and fourth AND gates and providing the (n+1)st significant bit of said sum.

7. The circuit of claim 6 wherein said n−1 first AND, second Exclusive OR and first OR gates form n−1 sets of gates, wherein said first set receives said least and second least significant bits of said numbers and provides the second least significant bit of said sum, said second set receives said second and third least significant bits of said numbers and provides the third least significant bit of said sum, and so forth.

8. A method of providing the sum of first and second n bit binary numbers having a difference of one or less comprising:
combining the least significant bits of said numbers in a first coincidence gate to provide the least significant bit of said sum;
combining the nth and (n−1)st bits of said numbers in a first logic network to provide the most significant bit of said sum; and
combining solely the ith and (i−1)st bits of said numbers in an ith logic network to provide the ith bit of said sum, for all values of i where $1<i<n+1$.

9. The method of claim 8 wherein said steps are substantially simultaneous.

10. The method of claim 8 wherein said first coincidence gate is an Exclusive OR gate.

11. The method of claim 8 wherein said step of combining the ith and (i−1)st bits further comprises:
combining said (i−1)st bits in a second coincidence gate; and
combining said ith bits in a third coincidence gate.

12. The method of claim 11 wherein said second gate is an AND gate and said third gate is an Exclusive OR gate.

13. The method of claim 11 further comprising:
combining the outputs of said second and third gates in an fourth coincidence gate, the output of which is the ith bit of said sum.

14. The method of claim 13 wherein said fourth gate is a OR gate.

15. The method of claim 8 wherein said step of combining the most and second most significant bits further comprises:
combining said nth bits in a first coincidence gate;
combining the nth and (n−1)st bits of said first number in a second coincidence gate; and
combining the nth and (n−1)st bits of said second number in a third coincidence gate.

16. The method of claim 15 wherein said first, second and third coincidence gates are AND gates.

17. The method of claim 15 further comprising:
combining the outputs of said first, second and third gates in an fourth coincidence gate, the output of which is the most significant bit of said sum.

18. The method of claim 17 wherein said fourth coincidence gate is an OR gate.

19. A method of providing the sum of first and second n bit binary numbers having a difference of one or less comprising the substantially simultaneous steps of:
combining the least significant bits of said numbers in a first Exclusive OR gate to provide the least significant bit of said sum;
combining the nth and (n−1)st bits of said numbers in a first logic network to provide the most significant bit of said sum; and
combining solely the ith and (i−1)st bits of said numbers in an ith logic network to provide the ith bit of said sum, for all values of i where $1<i<n+1$.

20. The method of claim 19 wherein said step of combining the ith and (i−1)st bits further comprises:
combining said (i−1)st bits in a first AND gate;
combining said ith bits in a second Exclusive OR gate; and
combining the outputs of said first AND gate and second Exclusive OR gate in a first OR gate, the output of which is the ith bit of said sum.

21. The method of claim 20 wherein said step of combining the most and second most significant bits further comprises:
combining said nth bits in a second AND gate;
combining the nth and (n−1)st bits of said first number in a third AND gate;
combining the nth and (n−1)st bits of said second number in a fourth AND gate; and
combining the outputs of said second, third, and fourth AND gates in a second OR gate, the output of which is the most significant bit of said sum.

22. The method of claim 21 further comprising:
combining third and fourth n bit binary numbers having a difference of one or less according to further steps similar to the original steps set forth for combining said first and second numbers, respectively, wherein said further steps are substantially simultaneous with said original steps.

23. The method of claim 22 wherein the sum of said first and second numbers and the sum of said third and fourth numbers have a difference of one or less, said method further comprising:
combining said sums according to steps similar to said original steps thereby providing a sum of said first, second, third and fourth numbers.

* * * * *